United States Patent
Lin et al.

(10) Patent No.: US 9,928,708 B2
(45) Date of Patent: Mar. 27, 2018

(54) REAL-TIME VIDEO ANALYSIS FOR SECURITY SURVEILLANCE

(71) Applicant: HAWXEYE, INC., Fremont, CA (US)

(72) Inventors: Andy Lin, Mountain View, CA (US); Kyle Neblett, Seattle, WA (US); Marios Savvides, Wexford, PA (US); Karanhaar Singh, West Windsor, NJ (US); Chandrasekhar Bhagavatula, Pittsburgh, PA (US)

(73) Assignee: HAWXEYE, INC., San Jose, CA (US)

( * ) Notice: Subject to any disclaimer, the term of this patent is extended or adjusted under 35 U.S.C. 154(b) by 0 days.

(21) Appl. No.: 14/968,714

(22) Filed: Dec. 14, 2015

(65) Prior Publication Data
US 2016/0171852 A1   Jun. 16, 2016

Related U.S. Application Data

(60) Provisional application No. 62/091,301, filed on Dec. 12, 2014.

(51) Int. Cl.
*G08B 13/196* (2006.01)
*G06K 9/00* (2006.01)
*G06T 7/215* (2017.01)

(52) U.S. Cl.
CPC ... *G08B 13/19608* (2013.01); *G06K 9/00771* (2013.01); *G06T 7/215* (2017.01);
(Continued)

(58) Field of Classification Search
None
See application file for complete search history.

(56) References Cited

U.S. PATENT DOCUMENTS 7,227,893 B1 * 6/2007 Srinivasa ........... G06K 9/00771
                                                              348/155
7,391,907 B1   6/2008 Venetianer et al.
(Continued)

FOREIGN PATENT DOCUMENTS

WO   2006/109162   10/2006

OTHER PUBLICATIONS

Schraml et al. "A Spatio-temporal Clustering Method Using Real-time Motion Analysis on Event0based 3D Vision," Proc. IEEE Computer Vision and Pattern Recognition Workshop (CVPRW), pp. 57-63, 2010.*
(Continued)

*Primary Examiner* — Matthew Bella
*Assistant Examiner* — Soo Shin
(74) *Attorney, Agent, or Firm* — Hogan Lovells US LLP (57) ABSTRACT

A camera and method identify moving objects of interest in a field of view of the camera. The method includes: capturing two or more images successively over a time period, each image being associated with different times during the time period; obtaining binary image from each successive pair of images, the binary image comprising a binary value at each pixel indicating whether a change in pixel values of at least a predetermined magnitude has occurred at that pixel between the time associated with the first image of the success pair of images and time associated with the second image of the successive pair of images; deriving one or more motion boxes each encapsulating one or more nearby pixels in binary image; processing motion boxes of each binary image to obtain refined motion boxes; and classifying refined motion boxes each into categories representative of one moving object of interest.

36 Claims, 5 Drawing Sheets

(52) U.S. Cl.
CPC ............... *G06T 2207/30232* (2013.01); *G08B 13/19602* (2013.01); *G08B 13/19663* (2013.01)

(56) References Cited

U.S. PATENT DOCUMENTS

| | | | |
|---|---|---|---|
| 8,520,899 | B2 | 8/2013 | Brown et al. |
| 8,655,020 | B2 | 2/2014 | Saptharishi et al. |
| 9,230,175 | B2* | 1/2016 | Gagvani ............ G06K 9/00543 |
| 2003/0086496 | A1* | 5/2003 | Zhang ................ G06K 9/00711 375/240.16 |
| 2005/0104958 | A1 | 5/2005 | Egnal et al. |
| 2006/0072014 | A1 | 4/2006 | Geng et al. |
| 2009/0110240 | A1* | 4/2009 | Verdant .................. G06T 7/254 382/103 |
| 2009/0244309 | A1* | 10/2009 | Maison .............. G06K 9/00369 348/222.1 |
| 2011/0116682 | A1* | 5/2011 | Wang ................. G06K 9/00771 382/103 |
| 2012/0232966 | A1 | 9/2012 | Calman et al. |
| 2014/0072213 | A1* | 3/2014 | Paiton .................. G06K 9/4619 382/165 |
| 2014/0176727 | A1* | 6/2014 | Saptharishi ........ G06K 9/00771 348/169 |
| 2016/0035107 | A1 | 2/2016 | Zheng et al. |
| 2016/0379074 | A1* | 12/2016 | Nielsen ................ G06K 9/3241 348/143 |

OTHER PUBLICATIONS

Vidal-Naquet et al. "Object Recognition with Informative Features and Linear Classification," IEEE Conf. on Computer Vision and Pattern Recognition, 2003.*
Malisiewicz et al. ("Detecting Objects via Multiple Segmentations and Latent Topic Models," Carnegie Mellon University, Tech. Rep., 2006.*
Sun et al., An Ensemble Framework for Object Detection in Intelligent Video Surveillance System, International Journal of Control and Automation, vol. 9, No. 2 (2016), pp. 239-248.
VideoIQ iCVR Cameras and Encoders, 2010, 4 pages.
Honeywell Building Solutions: Digital Video Manager Release 500, Specification and Technical Data, V1 Final: Mar. 2013, 22 pages.
Mohamed F. Abdelkader et al., "Integrated Motion Detection and Tracking for Visual Surveillance," Proceedings of the Fourth IEEE International Conference on Computer Vision Systems, ICVS 2006, 7 pages.

* cited by examiner

FIG.5

REAL-TIME VIDEO ANALYSIS FOR SECURITY SURVEILLANCE

CROSS REFERENCE TO RELATED APPLICATIONS

The present application relates to and claims priority under 35 U.S.C. § 119(e) of U.S. provisional patent application ("Provisional Application"), Ser. No. 62/091,301, entitled "Real-time Video Analysis for Security Surveillance," filed Dec. 12, 2014. The disclosure of the Provisional Application is hereby incorporated by reference in its entirety.

BACKGROUND

1. Technical Field

The present invention relates generally to security surveillance. In particular, the present invention relates to security surveillance using a video camera and to application of object classification technics to images captured using the video camera.

2. Discussion of the Related Art

Existing camera-equipped home security systems are expensive, requiring both remote servers to process the captured images and unnecessary human intervention. For example, in a typical object detection application, an object is detected in an image by classifying image patches across various shifts and across a variety of image scales. Specifically, if a pedestrian is to be detected, a typical system first generates a scale-space image pyramid to obtain images at various resolutions and to detect the pedestrian in all possible fixed-size windows across these images. Typically, great computational cost must be incurred to allow a system to robustly determine if an object is in an image and to classify objects at all locations and at all resolutions.

A security system is desired that allows a user to monitor a property in real-time, at an affordable cost, and without loss of privacy.

SUMMARY

According to one embodiment of the present invention, a system efficiently detects and classifies objects in a video feed of an embedded device, and notifies a user of a relevant classified object of interest. The system may carry out a method that includes (a) capturing two or more images successively over a time period, each image being associated with a different time during the time period; (b) obtaining a binary image from each successive pair of images, the binary image comprising a binary value at each pixel indicating whether or not a change in pixel values of at least a predetermined magnitude has occurred at that pixel between the time associated with the first image of the success pair of images and time associated with the second image of the successive pair of images; (c) deriving one or more motion boxes each encapsulating one or more nearby pixels in the binary image; (d) processing the motion boxes of each binary image to obtain refined motion boxes; and (e) classifying the refined motion boxes each into a category representative of one of the moving objects of interest.

A system of the present invention reduces costs to the user by performing real-time detection analyses on an existing low-cost camera. Unlike a typical object detection system in which private home video data are piped to a remote server for object motion analysis, a system of the present invention performs detection analysis efficiently from a server located in the camera itself, thus eliminating the need for connecting to a remote server.

According to the present invention, efficient object detection in a video stream may be accomplished using differencing to detect motion, motion box operations to refine the detected motion, and classification to identify objects in the detected motion. The video stream provides temporal information that can be used to improve detector speed and performance.

A system of the present invention differs from the prior art object detectors in at least two ways: (1) scale-invariance is achieved by focusing only on regions of interest, thereby requiring fewer levels of an image pyramid to be generated, and (2) using only a subset of prior frames in the video stream, the range of classification across shifts of the image is limited to the regions of interest. Performing object detection in this manner results in improved computational efficiency, especially if the regions of interest constitute a small portion of the image.

According to one embodiment of the present invention, the system operates on consecutive image frames in the video stream. As color information is not required, to avoid having to process multiple color channels, the system may convert the image frames to grayscale. Pixel differences between two image frames are each tested against a threshold value so as to create a binary difference frame: each value in the binary difference frame is assigned either binary value "1" or binary value "0", depending upon whether or not the magnitude of the pixel difference is greater than the threshold value. The "1" values in the image difference frame may indicate motion between the two frames. Such values in the image difference frame are enclosed by rectangular bounding boxes ("motion boxes") generated within two passes over consecutive image frames. In creating the motion boxes, a method may take into account that the background of many images is generally stationary, so that the regions of interest (i.e., where motion occurs) are likely small. If the motion parameters (e.g., the threshold value and a dilation radius) are carefully selected, accurate classification may he performed directly on an extracted region where motion is detected. In this regard, a classifier is preferably insensitive to small shifts and minor changes in aspect ratios, especially if the input video has a low frame rate. The system may also apply filtering techniques to improve accuracy in object classification. Such filtering techniques may include, for example, motion box filters that eliminate motion boxes deemed not containing an object of interest. Any number of filters may be used for different scenarios, such as area limiting filters and aspect ratio limiting filters.

According to one embodiment of the present invention, a system may apply a tracking algorithm to further enhance object detection performance by eliminating motion boxes unlikely to enclose moving objects of interest (e.g., a car or a pedestrian). Motion boxes that may be removed include transient fluctuations in the scene, such as lighting changes, or slight movements in generally stationary objects, such as branches of a tree moving in the wind. According to one embodiment of the present invention, the tracking algorithm operates only on motion boxes, not on an actual image or on a cropped actual image. Such an algorithm has the advantages of implementation simplicity and rapid execution on an embedded processor.

According to one embodiment of the present invention, the system may identify motion boxes that represent stationary objects based on a distance or displacement traveled by the motion box within a track. If the distance or displacement is less than a predetermined threshold, then the motion box is deemed representing a still object. If the object has previous been classified as a pedestrian or car, the system would reject the classification. In this way, the system not only filters false positives, but also avoids performing classification of objects on every frame, thus providing significant speedup in computational time, especially for complicated classifications.

The present invention is better understood upon consideration of the detailed description below in conjunction with the drawings.

DETAILED DESCRIPTION OF THE PREFERRED EMBODIMENTS

The present invention relates to systems and methods that perform efficient object detection in a video stream using differencing to detect motion, motion box operations that refine the detected motion, and classification methods to identify the objects in the detected motion.

Figure 1:
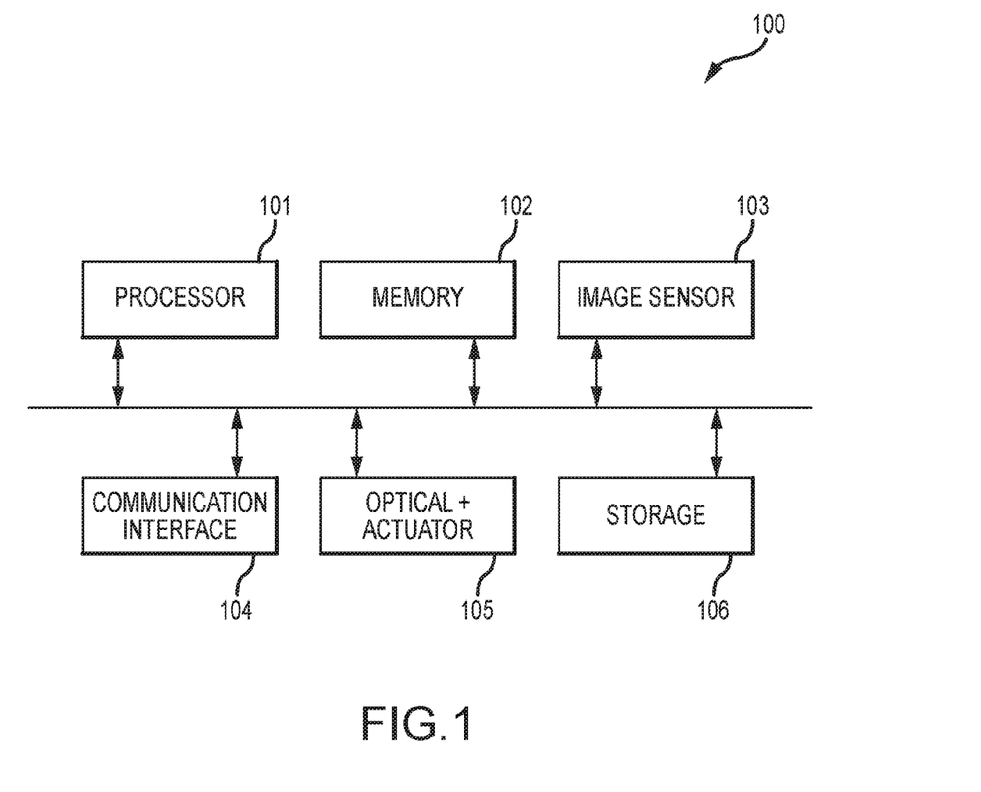
FIG. 1 is a block diagram of exemplary camera 100 that can be used to implement a system or a method of the present invention.

FIG. 1 is a block diagram of exemplary camera 100 that can be used to implement a system or a method of the present invention. As shown in FIG. 1, camera 100 may be an "IP camera" (i.e., a camera capable of communicate using the Internet Protocol), a USB camera (i.e., a camera having a Universal Serial Bus interface), or a camera capable of communicating with another device by any suitable means. As shown in FIG. 1, camera 100 includes processor 101, memory 102, image sensor 103, communication interfaces 104, camera optical and actuator system 105, and storage 106. Processor 101 controls the overall operations of the camera, such as operating camera optical and actuator system 105, and communication interfaces 104. Camera optical and actuator system 105 controls the operations of the camera, such as exposure control for image captured at image sensor 103. Camera optical and actuator system 105 may include a fixed lens system or an adjustable lens system (e.g., zoom and automatic focusing capabilities). Communication interfaces 104 typically include one or more communication interfaces (e.g., a network interface, a USB interface) which allows image data to be transferred from storage 106 to a communicating external device (e.g., a computer). Storage 106 provides non-volatile storage (e.g., archived images and software). Memory 102 provides runtime memory support for processor 101, such as frame buffers for image processing operations. Image sensor 103 captures images under control of processor 101 from light from the environment entering camera 100. The camera is capable of capturing the images from the environment. Sensor 103 may provide a color image or a gray-scale image.

In some embodiments, camera optical and actuator system 105 may include an infrared (IR) illumination system (e.g., IR light from light-emitting diodes (LED)) or any suitable illumination system for supplementing light when an environment does not provide sufficient illumination (e.g., at night).

According to one embodiment of the present invention, memory 102 may be allocated to include multiple memory spaces. such as a manufacturer's memory space, a developer's memory space, and a user memory space. The manufacturer's memory space may be provided for system software provided by the camera manufacturers, such as firmware for operating camera 100. The user memory space may be used, for example, for allocating frame buffers for image processing. Frame buffers are typically allocated for holding image data captured by image sensor 103. Such image data may include, for example, frame buffers holding consecutive frames of images. In one embodiment, at least 50 megabytes are allocated for frame buffers in the user memory space for two more consecutive frames of images. The developer's memory space may be used, for example, for holding software modules executed by processor 101 for carrying out a system or a method of the present invention.

Figure 2:
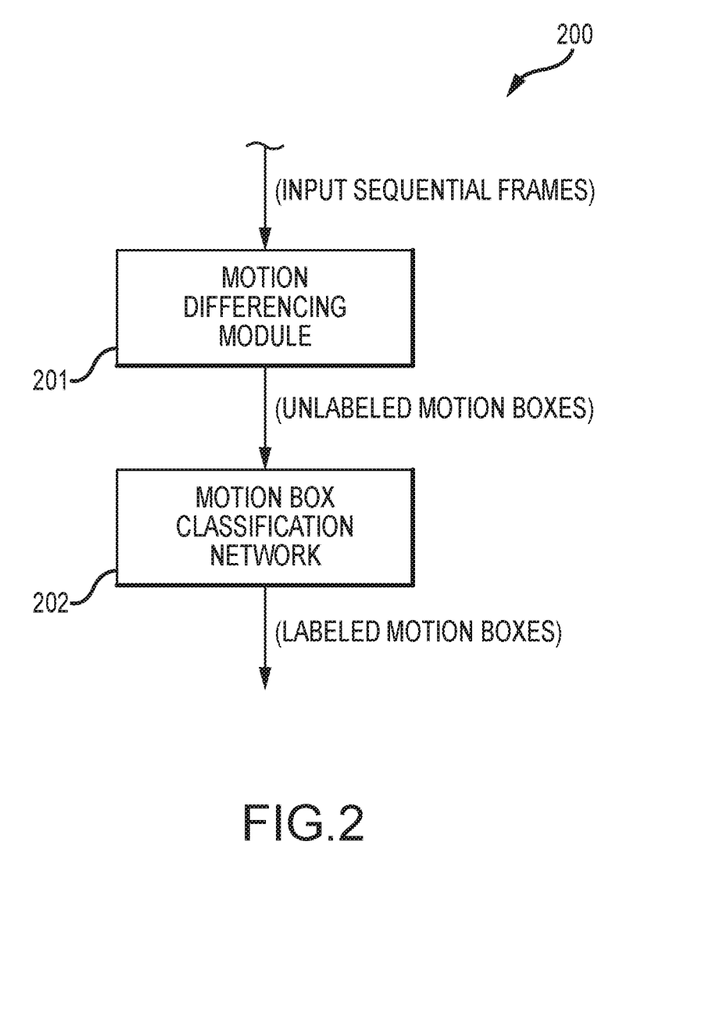
FIG. 2 is a block diagram which illustrates system 200 for object detection, in accordance with one embodiment of the present invention.

FIG. 2 is a block diagram which illustrates system 200 for object detection, in accordance with one embodiment of the present invention. As shown in FIG. 2, system 200 includes motion differencing module 201 and motion box classification network 202, which run in the developer memory space. Motion differencing module 201 receives at least two image frames, one earlier in time ("first frame") and another subsequent in time ("subsequent frame"), to surround candidate objects in the images that are in motion with bounding boxes, referred herein as "motion boxes." A motion box represents either a location to which a candidate object has moved, or a location of a candidate object that has entered the camera's field of view. Since the background for a security surveillance camera in many applications is generally stationary, the region of interest is likely to be small. Motion differencing module 201 detects regions of motion without use of expensive background modeling.

Motion box classification Network 202 categorizes the motion boxes to known objects (e.g., pets, pedestrians and cars). The frame rate is typically determined by camera settings. With a high frame rate, the system need not process every frame (i.e., the subsequent frame need not be immediately following the first frame, but may be selected to be a frame that follows the first frame by one or more skipped frames).

Figure 3:
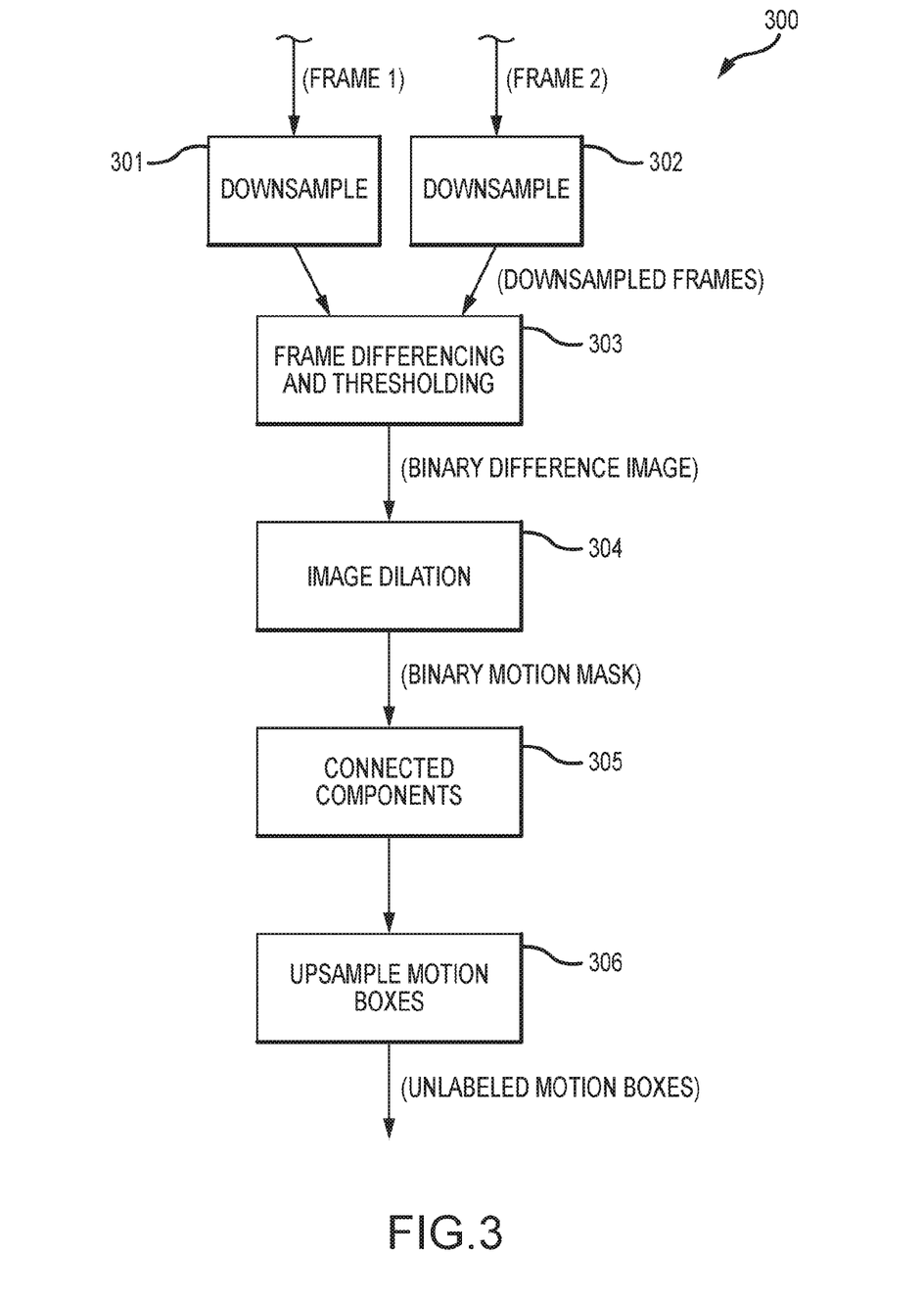
FIG. 3 is a block diagram showing in greater detail the operations of motion differencing module 201, according to one embodiment of the present invention.

FIG. 3 is a block diagram showing in greater detail the operations of motion differencing module 201, according to one embodiment of the present invention. Upon receiving the first and subsequent frames, motion differencing module 201 may convert the image data in the frame buffers to gray-scale. Such a conversion may be carried out in one of numerous ways. For example, image data may be represented by the RGB, the RGBA, or one of many industry standard image data formats under various color space representations. Typically, these data formats are expressed in multiple data channels, with one of the channels used to represent intensity. Alternatively, the intensity of each pixel may be derived from the image data in two or more of the channels. For example, under the RGB format, the intensity is a known weighted average of all three channels. Conversion from image data in industry standard image data to grey-scale data based on intensity is known to those skilled in the art. (Some cameras also provide a separate gray-scale channel for their color pictures.)

After conversion to grey-scale, as shown in FIG. 3, the frames are down-sampled in down-sampling modules 301 and 302 to enable image processing at a lower resolution. In some embodiments, down-sampling by 4 (e.g., reduction by a factor of 2 in each dimension of the 2-dimensional image) is achieved by simply sampling every other pixels in each dimension. which enables a potential approximate speedup by a factor of 4.

A binary-value frame buffer is then obtained in frame differencing and thresholding module 303 by (i) obtaining the magnitude of the difference between each pair of corresponding pixels in the down-sampled grayscale frames the first frame and the subsequent frame; and (ii) assigning each pixel in the binary-value frame buffer a binary value "1" when the magnitude of the difference of the corresponding pixels exceeds a pre-determined threshold value, and the binary value "0", otherwise. The binary-value buffer thus provides a binary-valued image ("binary image") which roughly shows which pixels changed value significantly between the first frame and the subsequent frame ("in motion"). As the first frame and the subsequent frame contain grey-scale image data, differencing involves only a single subtraction for each pixel. In most cameras, it is sufficient to express each grey-scale pixel by an 8-bit or a 16-bit value.

An optional step is then performed in image dilation module 304 on the binary-value frame buffer. Typically, the differencing operation provides a result that is best described in visual terms as a cluster of disjoint pixels. It is desired that these disjoint pixels be grouped together, to provide a connected "blob" for each object in motion. One method to achieve such grouping is the dilation mathematical morphological operator known to those of ordinary skill in the art. One implementation of image dilation is described, for example, on the web page: http://ostermiller.org/dilate_and_erode.html. In some embodiments, a Manhattan distance transform and thresholding steps are used to obtain a 4-way connected dilated image. Based on pre-determined system connectivity parameters, pixels that are adjacent to the pixels identified to be in motion are "flooded". In one embodiment, the pixels that are flooded are the adjacent pixels within a predetermined distance reachable by taking steps in the 4 orthogonal directions (i.e. x, −x, +y and −y directions). The flooded pixel is set to binary value "1". In one embodiment, the predetermined distance is empirically determined to be between 2 and 6, based on output resolution and system efficiency. Alternatively, a radial dilation may be used. In a radial dilation, all pixels within a predetermined distance are flooded. The resulting is a modified binary image. In this modified binary image, nearby disjointed pixels in motion may form "blobs" that each ideally represents an object in motion.

The modified binary image is then provided to connected components module 305 to determine connected components, which is accomplished by fitting a rectangle bounding box or motion box around each blob of the binary image, using a connected components algorithm. Efficient connected components algorithms have been studied extensively, and numerous such algorithms of different characteristics may be used. Selection of which algorithm to use may be determined by, for example, available memory or computational complexity (hence, execution speed). For example, one efficient algorithm is described in the web page: http://ieeexplore.ieee.org/stamp/stamp.jsp?tp=&arnumber=797615. This algorithm performs two passes over the binary image, using a simple array to efficiently keep track of equivalences. In the first pass, pixels are identified to be belonging to the same region of motion. In the second pass, each region of motion is associated with a region identification number, and each region of motioned so identified is provided the smallest rectangular motion box that contains all the pixels within the identified region of motion. A motion box may be represented, for example, by its co-ordinates at one corner (e.g., upper left), a width and a height (i.e., [x, y]$_{upper\ left}$, wide, high]). Other suitable representations for a motion box are also possible. For example, the motion box may be represented by coordinates of the corners along a diagonal (e.g., (x1, y1), (x2, y2)] where (x1, y1) defines the coordinate of the lower left corner and (x2, y2) defines the coordinate of the upper right corner). While rectangular bounding boxes are used as motion boxes, for convenience, other forms of bounding boxes can also be used (e.g., elliptical).

When down-sampling is carried out at down-sampling modules 301 and 302, to allow later reference to the images in the incoming frame buffers, the motion boxes thus created may be re-mapped to the coordinate system of the incoming frame buffers. This optional step is achieved at up-sampling module 306.

Once the motion boxes are identified, classification of the regions of motion may proceed. Alternatively, additional efficiency may be achieved by applying various motion box operations on the motion boxes and various feature extraction techniques before classification. These techniques may include one or more filters that pre-screen the motion boxes to aid and to improve classification performance. A motion box operation may include, for example, modifying, adding or removing motion boxes. After the motion box operations, the feature extraction techniques compute feature vectors for the motion boxes.

Classification assigns the candidate object to predetermined categories, such as "human", "car", "package", "pedestrian", "pet", "others", or the special "none" category. The "none" category contains objects that are determined to be "none of the above" or none of the previously defined categories. Motion box operations, feature extraction and classifications can be connected and interacted in various ways to provide a complicated classification system that can perform N-way classification, even though the classifier modules are perhaps only able to categorize feature vectors into a few classes. For example, modules for motion box modification and feature extraction may be provided as modular filters that can be connected in a network in arbitrary ways to adapt to different filtering requirements.

Figure 4:
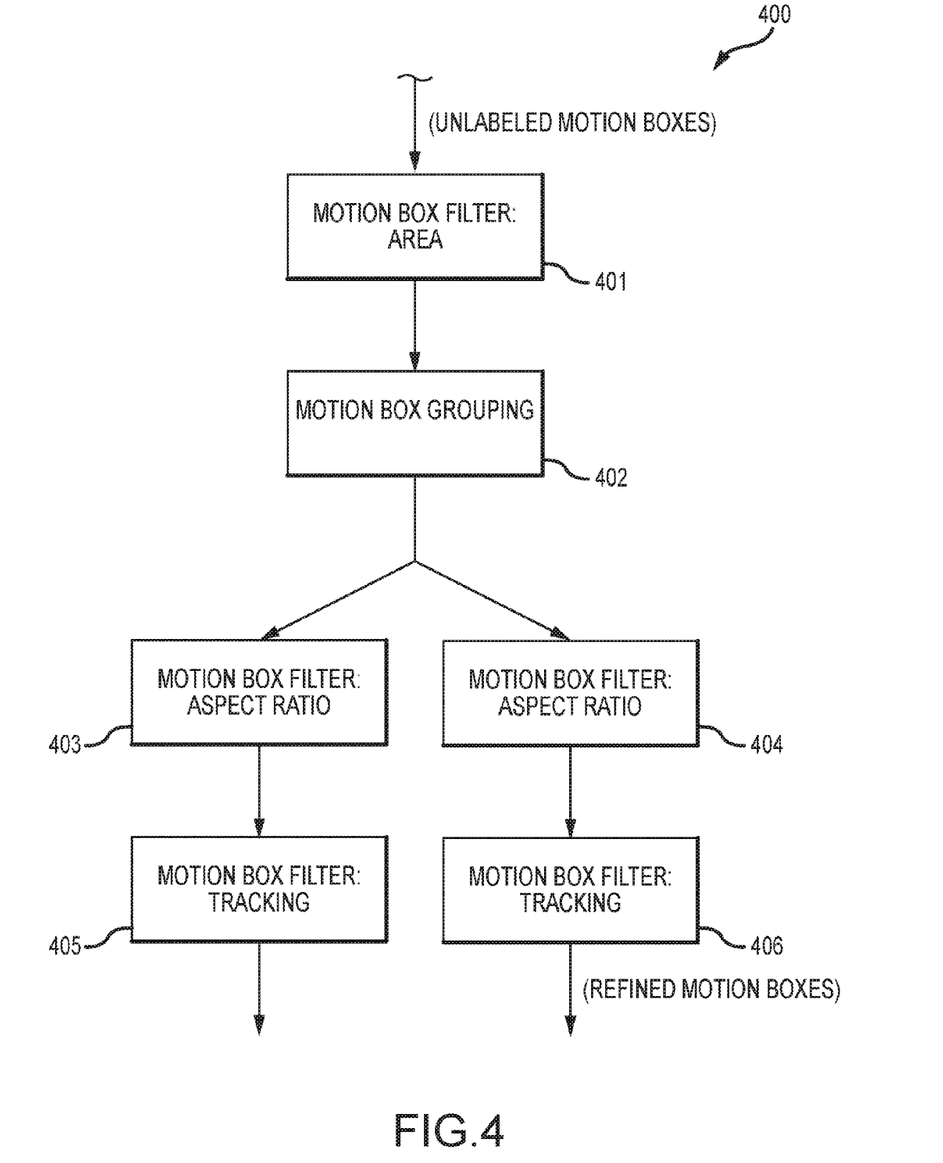
FIG. 4 is a block diagram showing motion box operations and feature extraction module 400, in accordance with one embodiment of the present invention.

FIG. 4 is a block diagram showing filters in motion box operations and feature extraction module 400, in accordance with one embodiment of the present invention. As shown in FIG. 4, area limiting filter 401 may be applied to remove motion boxes that are not within a predetermined range of areas. Motion boxes that are smaller than a predetermined minimum area are likely to correspond to individual pixels or tiny blobs, rather than objects of interests. Such motion boxes, which may result from noise, for example, or to small changes the lighting conditions, rather than an actual object moving across the scene, may be safely removed. On the other side of the filtered range, motion boxes that are larger than a predetermined maximum area (e.g., half the image) are likely to have resulted from exception conditions, e.g., someone tampering with the camera, or glitches in the input image stream, rather than an object of interest moving across the camera's field of vision.

FIG. 4 also shows motion box grouping module 402. Certain operations, e.g., image dilation, for example, may result in overlapping motion boxes over an object of interest, especially when the object of interest is large, close to the camera or both. Motion box grouping module 402 applies a grouping algorithm that merges overlapping boxes. The resulting merged motion box is the smallest motion box that contains all pixels of the overlapping motion boxes. To encourage merging of nearby motion boxes, motion boxes may be "stretched" (e.g., by increasing their widths and heights) to create overlaps. Stretching also helps in transforming certain motion boxes to forms that are more easily classified. Often, the resulting merged motion box entirely encapsulates the object of interest, which enhances the chance of accurate classification. In some embodiments, the stretch parameters, which are multiplicative factors for width and height, may be empirically determined. Motion box grouping module 402 may carry out multiple passes over the overlapping motion boxes, until the output set of motion boxes are non-overlapping.

As shown in FIG. 4, after processing in motion box grouping module 402, the motion boxes are provided to aspect ratio limiting filters 403 and 404. These filters each retain motion boxes that are within their respective specified ranges of aspect ratios. (An aspect ratio is the ratio of the motion box's height to the motion box's width.) Different objects of interest may have different ranges of aspect ratios in the binary image. For example, to detect a pedestrian, motion boxes having an aspect ratio less than 1.0 may be retained. Similarly, to detect a vehicle, motion boxes having an aspect ratio that is greater than 1.0 may be retained.

For many applications, e.g., security surveillance, objects of interest persists over multiple consecutive frames, and with their locations moving within characteristic ranges of distances from frame to frame. As shown in FIG. 4, motion boxes filtered by aspect ratio limiting filters 403 and 404 are "tracked" in motion box tracking filters 405 and 406. Initially, each tracking filter applies domain knowledge to eliminate motion boxes that do not persist over multiple consecutive frames, or do not have their locations moving within its characteristic range of distances from frame to frame. For example, a tracking filter may remove motion boxes that appear apparent as a result of transient fluctuations in the scene (e.g., lighting changes). Alternatively, a track filter may remove motion boxes of generally stationary objects (e.g., tree branches moving in the wind).

The motion box operation filters are modular, i.e., the output of one motion box filter provides motion boxes that can be used as input to another motion box filter, such that any number of motion box filters can be used in any suitable arrangement, thus motion box operations and feature extraction module 400 may be constructed and reconfigured with great flexibility. Each motion box operation can be combined and sequenced with other motion box operations in any suitable way seamlessly.

There are many suitable tracking algorithms. A tracking algorithm of the present invention operates on motion boxes alone, not an actual image or on a cropped actual image. Thus, the tracking algorithms of the present invention are simple to implement and fast to execute on an embedded processor. In some embodiments, a tracking algorithm of the present invention provides a data structure referred to as a "tracks". A track contains information of a motion box that has persisted over at least a predetermined number of frames. Ideally, the tracked motion box represents a tangible object (e.g., a pedestrian) that is moving across the frames. Each track may also indicate the missing frames, if any, in which the tracked bounding box is "missing." In one algorithm, a tracked motion box has to be persistent over a predetermined number of consecutive frames (e.g., at least k out of n, where k and n are the filter's parameters) to indicate a persistent object. A generally stationary object may be detected by examining the changes in distance or displacement in the track over a number of frames. If such change in distance or displacement is less than a predetermined value, then the track is determined to be a still object. In the cases where the candidate object is either pedestrian or a car (e.g., as determined by an aspect ratio), the track may be terminated.

Other metrics may be used in addition to determine whether or not two motion boxes appearing consecutive frames are "close enough" to be considered part of the same track. For example, an overlapping score, i.e., the ratio of intersecting areas of the two motion boxes to the area of a larger bounding box (e.g., the smallest bounding box containing both motion boxes), a value ranging between 0.0 and 1.0, may be used to determine whether or not the motion boxes relate to the same candidate object. In one embodiment, when the overlapping score for two motion boxes is greater than a predetermined value (e.g., 0.4), the two motion boxes are deemed to represent the same candidate object.

Generally, the tracking algorithm detects a motion pattern based on motion boxes locations, scale changes or other changes in motion box parameters in consecutive frames. Based on the detected motion box patterns, as compared to motion box patterns determined a priori, the tracking algorithm eliminates motion boxes that do not conform to the a priori motion box patterns.

As discussed above, classification refers to assigning a category to a set of feature vectors (e.g., images). In the context of the present invention, classification ("motion box classification") is performed on the portions of the image in the current frame referenced by the motion boxes provided after motion box operations and feature extractions. (Motion box operations and feature extractions are illustrated above in conjunction with FIG. 4.) According to one embodiment of the present invention, motion box classification also provides a confidence score associated with the determination. Many different classifiers may be used to implement a motion box classification module. For example, linear classification schemes, linear discrimination analysis ("LDA") schemes, or any of a number of machine learning approaches (e.g., neural networks).

Linear classification provides classifiers that are simple and can be executed quickly. However, such classifiers operate only at linear decision boundaries. Typically, a linear classifier is defined by an empirically determined weight vector and a empirically determined bias, the weight vector and the bias being derived from training. Typically, given a feature vector, a linear classifier computes a sum of the bias and an inner product between the feature vector and the weight vector. A binary decision may then he obtained by comparing the result with a threshold value.

Generally, a neural network model consists of an input layer, a number of hidden layers, and an output layer, each layer containing a number of neurons. Every pair of adjacent layers can he seen as a complete bipartite graph in which the neurons constitute the nodes of the graph. Each edge of the bipartite graphs is weighted and the neurons in each layer, except the input layer, have a corresponding bias. A neural network is trained using a large amount of data.

Figure 5:
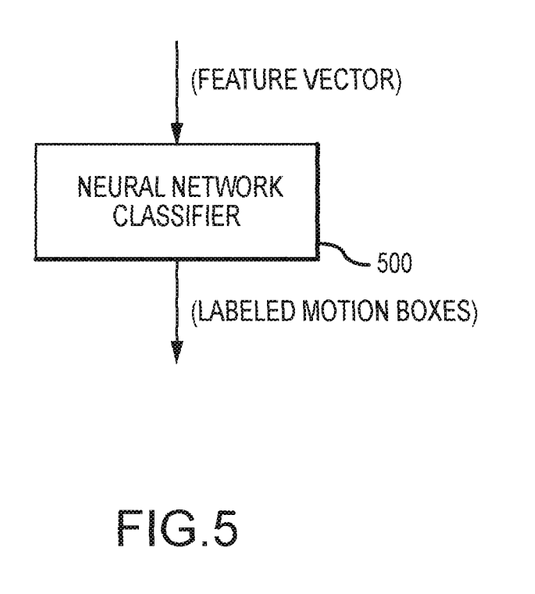
FIG. 5 is a block diagram illustrating the operation of neural network classifier 500 in accordance with one embodiment of the present invention.

Neural network-based classifiers have great potential to perform very well and be reasonably efficient. FIG. 5 is a block diagram illustrating the operation of neural network classifier 500 in accordance with one embodiment of the present invention. The neural network model that can be used in a camera as a classifier is preferably separately trained prior to deploying in normal operation. As shown in FIG. 5, an input feature vector (e.g, a set of motion boxes processed by the filters of FIG. 4) is provided to neural network classifier 500, which initiates the following steps that are repeated successively at each adjacent pair of layers until the output layer is reached.

a. applying weights: this step may be implemented using a matrix-to-vector multiplication, where the matrix contains the weights specific between the current and the next layer, and where the vector to be multiplied is the input vector;
  b. adding biases: this step may be implemented by adding the product vector from the matrix-to-vector multiplication to a vector of biases determined for the neurons of the next layer; and
  c. applying an activation function: this step may be implemented by normalizing each element of the biased product vector to a value between −1.0 and 1.0 using an appropriate logistic function (e.g., the arctangent function).

According to one embodiment. the output vector from the output layer of the neural network provides the values for object classification, e.g., as a probability distribution on the categories to which the candidate may be classified. For example. the output vector may show that a candidate object has probabilities 0.75, 0.2 and 0.05 for being a pedestrian, a car or another moving object.

Training of a neural network generally includes: (1) feeding examples. (2) analyzing the difference the output values with expected results, (3) adjust the parameters (i.e., the weights and biases) until desired output values are obtained or approached. In some embodiments of the present invention, a previously-trained neural network model is stored on the camera. The previously-trained neural network model includes a set of parameter values for a basic neural network with a flexible number of neurons to start the classification mission. In some embodiments, for each camera model. the previously-trained model was obtained by collecting data for the camera model using various operating situations and objects, such as humans approaching and moving away, a moving vehicle moving across the field of view, various lighting conditions.

Since the background is generally stationary in many camera feeds, the regions of interest (i.e., where motion occurs) are likely small. If the motion parameters (e.g., the threshold value for assigning the binary "1" and "0" values of the binary image and a dilation radius) are carefully selected, accurate classification may be performed directly on an extracted region where motion is detected. In this regard, a classifier is preferably invariant to small shifts and minor changes in aspect ratios, especially if the input video has a low frame rate.

According to one embodiment of the present invention, only a limited number of current color frames (e.g., the first frame and the subsequent frame) need to be saved, and only one binary image frame, corresponding to processing the first frame and the subsequent frame needs to reside in memory. The saved binary image is overwritten by the next binary image generated for the current subsequent frame and the next subsequent frame. In that embodiment, under most operating conditions, between 1 and 100 motion boxes are tracked. Therefore, the system and methods of the present invention are exceptionally efficient, and thus can be implemented in the limited memory and computational power of a typical surveillance camera without requiring data processing by a remote server.

The above detailed description is provided to illustrate specific embodiments of the present invention and is not intended to be limiting. Numerous variations and modifications within the scope of the present invention are possible. The present invention is set forth in the accompanying claims.

What is claimed is:

1. In a camera, a method for identifying moving objects of interest in a field of view of the camera, comprising:
  capturing two or more images successively over a time period, each image being associated with a different time during the time period;
  obtaining a binary image from each successive pair of images, the binary image comprising a binary value at each pixel indicating whether or not a change in pixel values of at least a predetermined magnitude has occurred at that pixel between the time associated with the first image of the successive pair of images and time associated with the second image of the successive pair of images;
  deriving one or more motion boxes each encapsulating one or more nearby pixels in the binary image;
  processing the motion boxes of each binary image to obtain refined motion boxes, wherein the motion boxes are processed using a plurality of modular filters each receiving one or more motion boxes as input and providing one or more processed motion boxes as output, the processed motion boxes of one of the modular filters being suitable to be provided as input to another one of the modular filters, the modular filters comprising one or more tracking filters, each tracking filter tracking motion boxes of the binary images through the time period, and the tracking filter rejects motion boxes that show a displacement over the time period that is less than a predetermined value; and
  classifying portions of the successive pair of images corresponding to the refined motion boxes each into a category representative of one of the moving objects of interest.

2. The method of claim 1, further comprising converting pixel values of the captured images to grey scale intensities.

3. The method of claim 1, wherein the successive pair of images are down-sampled prior to obtaining the binary image.

4. The method of claim 1, further comprising performing an image dilation step on the binary image.

5. The method of claim 4, wherein the image dilation step comprises a Manhattan transformation step.

6. The method of claim 4, wherein the image dilation step comprises a radial dilation step.

7. The method of claim 1, further comprises a connectivity analysis step for identifying the nearby pixels.

8. The method of claim 1, wherein the modular filters comprise one or more area limiting filters.

9. The method of claim 1, wherein the modular filters comprise one or more grouping filters.

10. The method of claim 9, wherein the motion boxes are stretched prior to applying the grouping filters.

11. The method of claim 1, wherein the modular filters comprise one or more aspect ratio filters.

12. The method of claim 1, wherein the tracking filter rejects motion boxes that do not persist over a pre-determined number of frames over the time period.

13. The method of claim 1, wherein the tracking filter rejects motion boxes that shows a total distance traversed over the time period that is less than a predetermined value.

14. The method of claim 1, wherein the refined motion boxes are classified according to a linear classification scheme.

15. The method of claim 1, wherein the refined motion boxes are classified according to a latent Dirichlet allocation scheme.

16. The method of claim 1, wherein the refined motion boxes are classified using a neural network implemented in a memory module of the camera.

17. The method of claim 16, wherein the neural network is previously-trained prior to implementation in the memory module of the camera.

18. A camera comprising:
an optical and actuation system;
a communication interface;
non-volatile storage;
a processor; and
a memory module, wherein the memory module, upon initialization, loads from the non-volatile storage instructions to be executed by the processor, the instructions comprising instructions for carrying out a method for identifying moving objects of interest in a field of view of the camera, the method comprising:
capturing two or more images successively over a time period, each image being associated with a different time during the time period;
obtaining a binary image from each successive pair of images, the binary image comprising a binary value at each pixel indicating whether or not a change in pixel values of at least a predetermined magnitude has occurred at that pixel between the time associated with the first image of the successive pair of images and time associated with the second image of the successive pair of images;
deriving one or more motion boxes each encapsulating one or more nearby pixels in the binary image;
processing the motion boxes of each binary image to obtain refined motion boxes, wherein the motion boxes are processed using a plurality of modular filters implemented as instructions executable by the processor, each modular filter receiving one or more motion boxes as input and providing one or more processed motion boxes as output, the processed motion boxes of one of the modular filters being suitable to be provided as input to another one of the modular filters, the modular filters comprising one or more tracking filters, each tracking filter tracking motion boxes of the binary images through the time period, and the tracking filter rejects motion boxes that shows a total distance traversed over the time period that is less than a predetermined value; and
classifying portions of the successive pair of images corresponding to the refined motion boxes each into a category representative of one of the moving objects of interest.

19. The camera of claim 18, wherein the memory module further loads for execution by the processor instructions for carrying out control methods for operating the optical and actuation system, the communication interface and the non-volatile storage.

20. The camera of claim 18, further comprising an infrared illumination system controlled by the processor.

21. The camera of claim 18, wherein the instructions further comprises instructions for converting pixel values of the captured images to grey scale intensities.

22. The camera of claim 18, wherein the successive pair of images are down-sampled prior to obtaining the binary image.

23. The camera of claim 18, wherein the instructions further comprises instructions for performing an image dilation step on the binary image.

24. The camera of claim 23, wherein the image dilation step comprises a Manhattan transformation step.

25. The camera of claim 23, wherein the image dilation step comprises a radial dilation step.

26. The camera of claim 18, wherein the instructions further comprises instructions for carrying out a connectivity analysis step for identifying the nearby pixels.

27. The camera of claim 18, wherein the modular filters comprise one or more area limiting filters.

28. The camera of claim 18, wherein the modular filters comprise one or more grouping filters.

29. The camera of claim 28, wherein the motion boxes are stretched prior to applying the grouping filters.

30. The camera of claim 18, wherein the modular filters comprise one or more aspect ratio filters.

31. The camera of claim 18, wherein the tracking filter rejects motion boxes that do not persist over a predetermined number of frames over the time period.

32. The camera of claim 18, wherein the tracking filter rejects motion boxes that show a displacement over the time period that is less than a predetermined value.

33. The camera of claim 18, wherein the refined motion boxes are classified according to a linear classification scheme.

34. The camera of claim 18, wherein the refined motion boxes are classified according to a latent Dirichlet allocation scheme.

35. The camera of claim 18, wherein the refined motion boxes are classified using a neural network implemented in a memory module of the camera.

36. The camera of claim 35, wherein the neural network is previously-trained prior to implementation in the memory module of the camera.

* * * * *